United States Patent [19]

Bell et al.

[11] Patent Number: 4,730,025

[45] Date of Patent: Mar. 8, 1988

[54] HEXACHLOROCYCLOPENTADIENE END GROUP POLYMERS

[75] Inventors: Anthony J. Bell, Stow; Adel F. Halasa, Bath; Kenneth F. Castner, Uniontown; George F. Balogh, N. Canton, all of Ohio

[73] Assignee: The Goodyear Tire & Rubber Company, Akron, Ohio

[21] Appl. No.: 910,035

[22] Filed: Sep. 22, 1986

[51] Int. Cl.[4] .............................................. C08C 19/18
[52] U.S. Cl. .............................. 525/332.3; 525/332.1; 525/359.5
[58] Field of Search ........................... 525/332.3, 359.5

Primary Examiner—Christopher Henderson
Attorney, Agent, or Firm—Alvin T. Rockhill

[57] ABSTRACT

Metals from Groups I and II of the periodic table are commonly used to initiate the polymerization of conjugated diolefin monomers into polymers. The polymers formed in such polymerizations are terminated with the metal used to initiate the polymerization and are sometimes referred to as living polymers. Reactive end groups can be affixed to the chain ends of such polymers by utilizing the process of this invention. Such reactive end groups can subsequently be reacted with the backbone of other polymer chains. This results in the formation of a polymer having a reduced number of dangling chain ends. The functionalizing agents which can be utilized in the preparation of such polymers include hexachlorocyclopentadiene, tetraalkylthiuram disulfides, and chlorinated phenyl fulvenes.

20 Claims, No Drawings

HEXACHLOROCYCLOPENTADIENE END GROUP POLYMERS

BACKGROUND OF THE INVENTION

Metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into cis-1,4-polyisoprene or to initiate the polymerization of 1,3-butadiene into high vinyl polybutadiene.

The polymers formed in such polymerizations are terminated with the metal used to initiate the polymerization and are sometimes referred to as living polymers. They are referred to as living polymers because the polymer chains which are terminated with the metal initiator continue to grow or live until all of the available monomer is exhausted. Polymers that are prepared by utilizing such metal initiators normally have structures which are essentially linear and normally do not contain appreciable amounts of branching.

Such polymers are normally vulcanized or cured utilizing agents, such as sulfur, which promote cross-linking between the backbones of polymer chains. This causes such polymers to contain large concentrations of dangling chain end segments. It has been established that within a series of polymers of the same composition that tan delta at 60° C. decreases with increasing polymer molecular weight (assuming the same degree of branching). This reduction in tan delta at 60° C. with increasing molecular weight is a direct result of a lower concentration of dangling chain end segments in the cured rubber. Therefore, the trend in tire polymer synthesis is toward very high molecular weight elastomers. This is because a low tan delta at 60° C. is indicative of low hysteresis and consequently tires made utilizing such elastomers with low tan delta values have lower rolling resistance.

The trend toward reducing tan delta at 60° C. by producing higher molecular weight elastomers has introduced problems in both polymer synthesis and processing. For instance, increasing the molecular weight of polymers made utilizing organolithium catalysts requires lowering the initiator concentration which results in lower production rates. It is also much more difficult to process and mix elastomers having very high molecular weights in the compounding stage.

SUMMARY OF THE INVENTION

The present invention allows for the synthesis of elastomers containing functional end groups which react with polymer backbones during vulcanization. This results in a lower concentration of dangling end segments in such cured polymers. This is in contrast to conventional elastomers containing end groups which are not reactive and which upon vulcanization contain high concentrations of dangling end segments which are elastically ineffective. Accordingly, the subject invention can be utilized to prepare cured polymers which contain minimal amounts of dangling end segments. Such polymers offer low hysteresis and can be utilized in the preparation of tires which have low rolling resistance.

The present invention more specifically discloses an endbindable polydiene having dialkyl dithio carbamyl end groups which is comprised of polymer chains which are comprised of repeat units which are derived from at least one conjugated diolefin monomer wherein said polymer chains are terminated with dialkyl dithio carbamyl end groups having the structural formula:

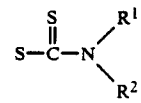

wherein $R^1$ and $R^2$ are alkyl groups containing from 1 to about 10 carbon atoms.

The subject invention also discloses an endbindable polydiene having xanthogen end groups which is comprised of polymer chains which are comprised of repeat units which are derived from at least one conjugated diolefin monomer wherein said polymer chains are terminated with xanthogen end groups having the structural formula:

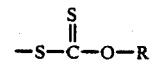

wherein R represents an alkyl group containing from 1 to about 10 carbon atoms.

The present invention also reveals a process for preparing an endbindable polydiene having dialkyl dithio carbamyl end groups which comprises reacting a metal terminated polydiene with a tetraalkylthiuram disulfide at a temperature within the range of about 0° C. to 150° C., wherein the alkyl groups in the tetraalkylthiuram disulfide contain from 1 to about 10 carbon atoms.

The subject invention further discloses a process for endbinding a polydiene having dialkyl dithio carbamyl end groups which comprises heating the polydiene having dialkyl dithio carbamyl end groups to a temperature above about 100° C., wherein the polydiene having dialkyl dithio carbamyl end groups is comprised of polymer chains which are comprised of repeat units which are derived from at least one conjugated diolefin monomer and wherein said polymer chains are terminated with dialkyl dithio carbamyl end groups having the structural formula:

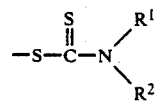

wherein $R^1$ and $R^2$ are alkyl groups containing from 1 to about 10 carbon atoms.

This invention also relates to a process for endbinding a metal terminated polydiene comprising:

(a) reacting the metal terminated polydiene with a tetraalkylthiuram disulfide, wherein the alkyl groups in the tetraalkylthiuram disulfide contain from 1 to about 10 carbon atoms, to produce a polymer which terminated with dialkyl dithio carbamyl end groups; and (b) allowing the polydiene which is terminated with dialkyl dithio carbamyl end groups to endbind at a temperature above about 100° C.

This invention also reveals an endbindable polydiene having chlorinated cyclopentadienyl end groups which is comprised of polymer chains which are comprised of repeat units which are derived from at least one conjugated diolefin monomer wherein said polymer chains are terminated with chlorinated cyclopentadienyl groups having the structural formula:

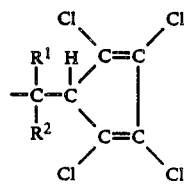

wherein $R^1$ represents a member selected from the group consisting of hydrogen atoms, alkyl groups, aryl groups, and carboalkoxy groups and wherein $R^2$ represents a member selected from the group consisting of alkyl groups, aryl groups and carboalkoxy groups.

The subject invention further relates to a process for preparing an endbindable polydiene which comprises (a) reacting a metal terminated polydiene with 1,2,3,4,5,5-hexachloro-1,3-cyclopentadiene at a temperature within the range of about 0° C. to 150° C. to produce said endbindable polydiene.

The present invention also discloses a process for preparing an endbindable polydiene which comprises (a) reacting a metal terminated polydiene with a functionalization agent having the structural formula

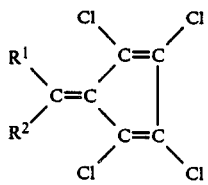

wherein $R^1$ represents a member selected from the group consisting of hydrogen atoms, alkyl groups containing from 1 to 20 carbon atoms, aryl groups containing from 6 to 20 carbon atoms, and carboalkoxy groups containing from 3 to 20 carbon atoms, and wherein $R^2$ represents a member selected from the group consisting of alkyl groups containing from 1 to 20 carbon atoms, aryl groups containing from 6 to 20 carbon atoms, and carboalkoxy groups containing from 3 to 20 carbon atoms, to produce a metal salt; and (b) deactivating the metal salt with a proton donor to produce said endbindable polydiene.

This invention further reveals a process for preparing an endbindable polydiene which comprises (a) reacting a metal terminated polydiene with a functionalization agent having the structural formula

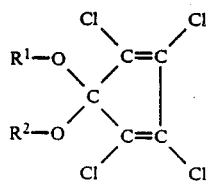

wherein $R^1$ and $R^2$ are $\alpha,\beta$-unsaturated carbonyl groups containing from 3 to 20 carbon atoms, to produce a metal salt; and (b) deactivating the metal salt with a proton donor to produce said endbindable polydiene.

Propylene sulfide, elemental sulfur, and carbon disulfide can be used as functionalizing agents to endbind metal terminated polymers. However, problems have been encountered in attempts to scale up processes utilizing these functionalization agents.

DETAILED DESCRIPTION OF THE INVENTION

The subject invention provides a means for endbinding polydienes. This endbinding reaction entails reactive end groups on polymer chains reacting with double bonds in the backbones of other polymer chains. This endbinding reaction results in the formation of chemical bonds between the ends of polymer chains and the backbones of other polymer chains. Accordingly, this reaction consumes dangling chain end segments.

The process of the present invention can be used to endbind any polymer which is terminated with a metal of group I or II of the periodic table. These polymers can be produced utilizing techniques that are well known to persons skilled in the art. The initiator used in initiating the polymerization utilized in producing such polymers is most commonly selected from the group consisting of barium, lithium, magnesium, sodium, and potassium. Lithium and magnesium are the metals that are most commonly utilized in the synthesis of such metal terminated polymers (living polymers). U.S. Pat. No. 4,048,420, which is incorporated herein by reference in its entirety, describes the synthesis of a lithium terminated polymer which is catalyzed with very finely divided lithium having an average particle diameter of less than 2 microns.

Organolithium compounds are the preferred initiators for utilization is such polymerizations. The organolithium compounds which are utilized as initiators are normally organo monolithium compounds. The organolithium compounds which are preferred as initiators are monofunctional compounds which can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of preferred organolithium compounds include methyllithium, ethyllithium, isopropyllithium, n-butyllithium, secbutyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred organolithium initiator.

The amount of organolithium initiator utilized will vary depending upon the molecular weight which is desired for the polymer being synthesized as well as the precise polymerization temperature which will be utilized. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The metal terminated polymers to which the present invention pertains which can be made utilizing organomonofunctional initiators have the general structural formula P-M, wherein P represents a polymer chain and wherein M represents a metal of group I or II. The metal terminated polymers utilized in the practice of this invention can be of virtually any molecular weight. However, the maximum benefits of this invention will be realized when polymers having number average molecular weights within the range of about 50,000 to about 500,000 are used. It is normally preferred for such polymers to have number average molecular weights within the range of 100,000 to 250,000. The metal initiators utilized in the synthesis of such metal terminated polymers can also be multifunctional organometallic compounds. For instance, difunctional organometallic compounds can be utilized to initiate such polymerizations. The utilization of such difunctional organometallic compounds as initiators generally results in the formation of polymers having the general structural formula M-P-M, wherein P represents a polymer chain and wherein M represents a metal of group I or II. Such polymers which are terminated at both of their chain ends with a metal from group I or II can be treated so as to affix reactive end groups to both of their chain ends. Such polymers can subsequently be endbound at both of their chain ends. Thus, dangling chain ends in polymers which are made by utilizing difunctional organometallic initiators can be virtually eliminated. However, the benefits attained by utilizing difunctional initiators and endbinding both of the chain ends of high molecular weight polymers is minimal. In other words, high molecular weight endbound polymers which are made using monofunctional organometallic initiators have properties which are almost as good as those of high molecular weight enbound polymers which are made utilizing difunctional organometallic initiators.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrenebutadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1vinylnapthalene, 6-cyclohexyl-1-vinylnapthalene, 7-dodecyl-2-vinylnapthalene, α-methylstyrene, and the like.

Metal terminated polymers are generally prepared in solution polymerizations which utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. Such solution polymerizations result in the formation of a polymer cement (a highly viscous solution of the polymer).

The metal terminated polymers in such polymer solutions can be functionalized with reactive end groups by simply adding a stoichiometric amount of one of the functionalizing agents of this invention to the solution. In other words, approximately one mole of functionalizing agent is added per mole of terminal metal groups in the living polymer. The number of moles of metal end groups in such polymers is assumed to be the number of moles of the metal utilized in the initiator. It is, of course, possible to add greater amounts of the functionalizing agent being used. However, the utilization of greater amounts is not beneficial. Nevertheless, in many cases it will be desirable to utilize a slight excess of the functionalizing agent in order to insure that at least a stoichiometric amount is actually employed. In most cases from about 0.8 to about 1.1 moles of the functionalizing agent will be utilized per mole of metal end groups in the living polymer being treated. In the event that it is not desired to endbind all of the dangling chain ends in a polymer then, of course, lesser amounts of the functionalizing agent can be utilized.

The functionalizing agents of this invention will react with metal terminated living polymers over a very wide temperature range. For practical reasons the functionalization of such living polymers will normally be carried out at a temperature within the range of 0° C. to 150° C. In most cases it will be preferred to utilize a temperature within the range of 20° C. to 100° C. with temperatures within the range of 50° C. to 80° C. being most preferred. The functionalization reaction is very rapid and only very short reaction times are required.

The functionalizing agents which are utilized in the practice of this invention include tetraalkylthiuram disulfides, xanthates, and certain compounds containing tetrachlorocyclopentadiene radicals. The tetraalkylthiuram disulfides which can be utilized have the general structural formula:

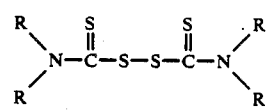

wherein R represents alkyl groups containing from 1 to about 10 carbon atoms. In order for the tetraalkylthiuram disulfide to have good solubility in the organic solvent being utilized it is normally preferred for the alkyl groups therein to contain from 2 to 6 carbon atoms. Tetraethylthiuram disulfide is a highly preferred functionalizing agent for utilization in the practice of this invention. Diethyl thio dicarbonate and diethyl thio peroxydicarbonate are representative examples of xanthates that can be used as functionalizing agents.

It has been determined that 1,2,3,4,5,5-hexachloro-1,3-cyclopentadiene is an effective functionalizing agent. It has the structural formula:

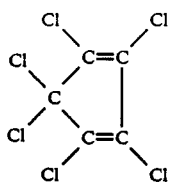

It has also been determined that functionalizing agents having the structural formula:

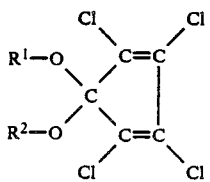

wherein $R^1$ and $R^2$ are $\alpha,\beta$-unsaturated carbonyl groups containing from 1 to 20 carbon atoms, are very effective. A highly preferred functionalizing agent of this type has the structural formula:

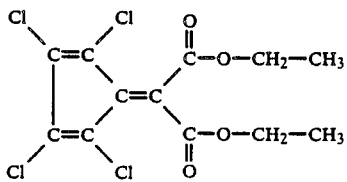

Certain chlorinated fulvenes can also be utilized as functionalizing agents. Such chlorinated fulvenes have the general structural formula:

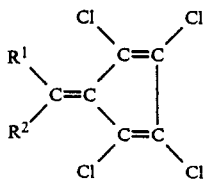

wherein $R^1$ represents a member selected from the group consisting of hydrogen atoms, alkyl groups containing from 1 to 20 carbon atoms, aryl groups containing from 1 to 20 carbon atoms, and carboalkoxy groups containing from 3 to 20 carbon atoms, and wherein $R^2$ represents a member selected from the group consisting of alkyl groups containing from 1 to 20 carbon atoms, aryl groups containing from 6 to 20 carbon atoms, and carboalkoxy groups containing from 3 to 20 carbon atoms. A highly preferred chlorinated fulvene of this type has the structural formula:

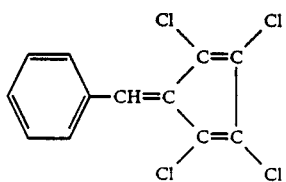

Such chlorinated fulvenes react with metal terminated polymers so as to provide them with reactive end groups. In the case of chlorinated fulvenes these reactive end groups have the structural formula:

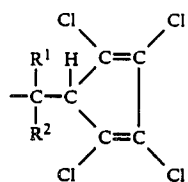

wherein $R^1$ represents a member selected from the group consisting of hydrogen atoms, alkyl groups containing from 1 to 20 carbon atoms, aryl groups containing from 6 to 20 carbon atoms, and carboalkoxy groups containing from 3 to 20 carbon atoms, and wherein $R^2$ represents a member selected from the group consisting of alkyl groups containing from 1 to 20 carbon atoms, aryl groups containing from 6 to 20 carbon atoms, and carboalkoxy groups containing from 3 to 20 carbon atoms. Reactive end groups of this type can react with double bonds in the backbone of polymer chains. A type of Diels-Alder reaction occurs with the linkages formed having the structural formula:

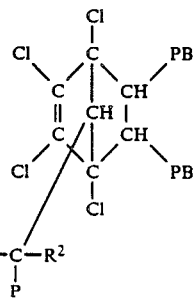

wherein P represents the polymer chain of the polymer which contained the reactive end group, wherein PB represents the backbone of another polymer chain, wherein $R^1$ represents a hydrogen atom, an alkyl group containing from 1 to 20 carbon atoms, an aryl group containing from 6 to 20 carbon atoms, or a carboalkoxy group containing from 3 to 20 carbon atoms; and wherein $R^2$ represents an alkyl group containing from 1 to 20 carbon atoms, an aryl group containing from 6 to 20 carbon atoms or a carboalkoxy group containing from 3 to 20 carbon atoms.

The reactive end groups which are prepared by utilizing tetraalkylthiuram disulfide functionalizing agents have the structural formula:

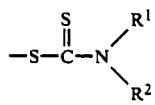

wherein $R^1$ and $R^2$ are alkyl groups containing from 1 to about 10 carbon atoms. The reactive end groups that are prepared by utilizing xanthates as functionalizing agents have the structural formula:

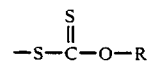

wherein R represents an alkyl group containing from 1 to about 10 carbon atoms.

The reaction between tetraalkylthiuram disulfides or xanthates and living metal terminated polymers deactivates the polymer. Accordingly, a separate deactivation step is not required. The utilization of 1,2,3,4,5,5-hexachloro-1,3-cyclopentadiene as a functionalizing agent also results in deactivation of the polymer.

The utilization of chlorinated fulvenes as functionalizing agents does not automatically deactivate the living polymer being treated. In fact, the reaction between such chlorinated fulvenes and living polymers which are terminated with metal end groups results in the formation of a metal salt. It is accordingly necessary to deactivate the metal salt with a proton donor prior to curing the polymer. This deactivation step can be carried out utilizing known techniques and known proton donors. For instance, water, methanol, ethanol and other common alcohols can be utilized in this deactivation procedure. The utilization of functionalizing agents having the structure:

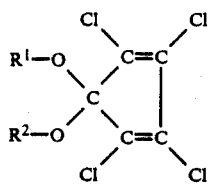

also results in the formation of metal salts which need to be deactivated before the polymer is cured.

After the polymer containing reactive end groups is produced it can be cured utilizing conventional techniques and standard cure temperatures. The temperatures utilized in curing the polymer will promote the endbinding reaction. In most cases the curing temperature utilized to endbind such polymers will be above about 100° C. In most cases the endbinding will be carried out at a temperature within the range of about 120° C. to 200° C. It is generally more preferred for the endbinding to be carried out at a standard cure temperature within the range of about 135° C. to about 165° C.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

A living high vinyl polybutadiene which was prepared utilizing an organolithium catalyst was functionalized utilizing a chlorinated fulvene having the structural formula:

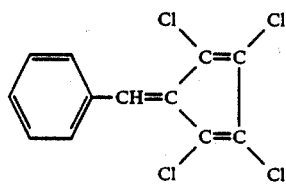

One mole of the functionalizing agent was utilized per mole of lithium calculated to be in the lithium terminated polybutadiene. The functionalizing agent was added directly to the organic medium utilized in the synthesis of the high vinyl polybutadiene. The functionalizing agent was, of course, added before the reaction was shortstopped. This was carried out at a temperature of 65° C.

An antioxidant and shortstop were subsequently added. The polymer cement was air dried overnight and then vacuum dried at 50° C. for 24 hours.

The polymer was then compounded using a standard recipe which consisted of 45 parts of carbon black, 9 parts of an extender oil, 1.6 parts of sulfur, 3.2 parts of zinc oxide, and about 1 part of processing aids. The compounded rubber was then cured at a temperature of 300° F. (149° C.). Tan delta was determined using a Rheovibron dynamic viscoelastometer at 11 Hz. The tan delta at 60° C. of the cured rubber was then determined to be 0.076. This experiment clearly shows that the functionalizing agents of this invention can be utilized in order to reduce the amount of dangling chain ends in a polymer which results in a lower tan delta value. This characteristic is very valuable in tire tread compounds where low rolling resistance is required.

EXAMPLE 2

(Comparative)

The same procedure specified in Example 1 was utilized in this experiment except that the high vinyl polybutadiene was not treated with the functionalizing agent. In this experiment the high vinyl polybutadiene after being cured was determined to have a tan delta at 60° C. of 0.092. This example served as a control to show that the tan delta of unfunctionalized polymers is significantly higher than the tan delta value which is attained in cured polymers which were functionalized utilizing the functionalizing agents of this invention.

EXAMPLE 3

In this experiment a functionalizing agent was prepared by reacting hexachlorocyclopentadiene and ethylmalonate in the presence of triethylamine. The functionalizing agent produced is postulated to have the formula:

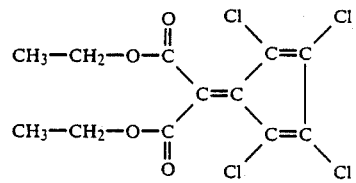

In this experiment the functionalizing agent produced was substituted for the functionalizing agent utilized in Example 1 with the same procedure being carried out. It was determined that the functionalizing agent utilized in this experiment reduced the tan delta at 60° C. of the cured elastomer to 0.093 from a control value of 0.111.

EXAMPLE 4

In this experiment 1,2,3,4,5,5-hexachloro-1,3-cyclopentadiene was utilized as the functionalizing agent in treating a medium vinyl polybutadiene. The procedure utilized was in other respects like the procedure utilized in Example 1. In this experiment the cured medium vinyl polybutadiene had a tan delta at 60° C. of 0.066. This compares very favorably to the tan delta of a cured medium vinyl polybutadiene which was prepared in a control experiment which had a tan delta at 60° C. of 0.080.

While certain representative embodiments and details have been shown for the purpose of illustrating the present invention, it will be apparent to those skilled in this art that various changes and modifications can be made therein without departing from the scope of the present invention.

What is claimed is:

1. The endbindable polydiene prepared by a process which comprises (a) reacting a metal terminated polydiene with 1,2,3,4,5,5-hexachloro-1,3-cyclopentadiene at a temperature within the range of about 0° C. to 150° C. to produce said endbindable polydiene.

2. An endbindable polydiene having chlorinated cyclopentadienyl end groups which is comprised of polymer chains which are comprised of repeat units which are derived from at least one conjugated diolefin monomer wherein said polymer chains are terminated with chlorinated cyclopentadienyl groups having the structural formula:

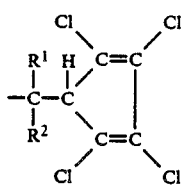

wherein $R^1$ represents a member selected from the group consisting of hydrogen atoms, alkyl groups, aryl groups, and carboalkoxy groups and wherein $R^2$ represents a member selected from the group consisting of alkyl groups, aryl groups and carboalkoxy groups.

3. An endbindable polydiene as specified in claim 2 wherein $R^1$ reprsents a member selected from the group consisting of hydrogen atoms, alkyl groups containing from 1 to 20 carbon atoms, aryl groups containing from 6 to 20 carbon atoms, and carboalkoxy groups containing from 3 to 20 carbon atoms and wherein R2 represents a member selected from the group consisting of alkyl groups containing from 1 to 20 carbon atoms, aryl groups containing from 6 of 20 carbon atoms, and carboalkoxy groups containing from 3 to 20 carbon atoms.

4. An endbindable polydiene as specified in claim 3 wherein said polydiene is comprised of repeat units which are derived from at least one conjugated diolefin monomer containing from 4 to 8 carbon atoms.

5. An endbindable polydiene as specified in claim 4 wherein said endbinadable polydiene has a number average molecular weight which is within the range of about 50,000 to about 500,000.

6. An endbindable polydiene as specified in claim 5 wherein said polydiene is comprised of repeat units which are derived from butadiene.

7. An endbindable polydiene as specified in claim 4 wherein said endbindable polydiene has a number average molecular weight which is within the range of 100,000 to 250,000.

8. A polydiene as specified in claim 1 wherein said temperature is within the range of 20° C. to 100° C.

9. A polydiene as specified in claim 1 wherein said metal terminated polydiene is comprised of repeat units which are derived from at least one conjugated diolefin monomer containing from 4 to 8 carbon atoms.

10. A polydiene as specified in claim 9 wherein said temperature is within the range of 20° C. to 100° C.

11. A polydiene as specified in claim 8 wherein said metal terminated polydiene is comprised of repeat units which are derived from butadiene.

12. A polydiene as specified in claim 9 wherein said temperature is within the range of 50° C. to 80° C.

13. A polydiene as specified in claim 12 wherein from about 0.8 to about 1.1 moles of 1,2,3,4,5,5-hexachloro-1,3-cyclopentadiene are utilized per mole of metal end groups in the metal terminated polydiene.

14. A polydiene as specified in claim 1 wherein said metal is selected from the group consisting of barium, lithium, magnesium, sodium, and potassium.

15. A polydiene as specified in claim 1 wherein said metal is selected from the group consisting of lithium and magnesium.

16. A polydiene as specified in claim 1 wherein said metal is lithium.

17. A polydiene as specified in claim 9 wherein said metal is selected from the group consisting of lithium and magnesium.

18. A polydiene as specified in claim 9 wherein said metal is lithium.

19. A polydiene as specified in claim 10 wherein said metal is lithium.

20. A polydiene as specified in claim 13 wherein said metal is lithium and wherein said metal terminated polydiene is comprised of repeat units which are derived from butadiene.

* * * * *